(12) United States Patent
Moran et al.

(10) Patent No.: US 12,093,167 B1
(45) Date of Patent: Sep. 17, 2024

(54) OPTIMIZED MODIFICATIONS TO A WEBSITE

(71) Applicant: Mike Moran Group, LLC, Piscataway, NJ (US)

(72) Inventors: Michael E Moran, Jersey City, NJ (US); Stephan Greene, Bethesda, MD (US); William Edmonds, Jr., North Las Vegas, NV (US); Shamoy Baker, Brooklyn, NY (US); Abdullah Noman, Flushing, NY (US)

(73) Assignee: Mike Moran Group LLC, Piscataway, NJ (US)

( * ) Notice: Subject to any disclaimer, the term of this patent is extended or adjusted under 35 U.S.C. 154(b) by 55 days.

(21) Appl. No.: 18/108,472

(22) Filed: Feb. 10, 2023

Related U.S. Application Data

(60) Provisional application No. 63/308,935, filed on Feb. 10, 2022, provisional application No. 63/325,575, filed on Mar. 30, 2022.

(51) Int. Cl.
*G06F 11/36* (2006.01)
*G06F 16/957* (2019.01)

(52) U.S. Cl.
CPC ........ *G06F 11/3664* (2013.01); *G06F 16/957* (2019.01)

(58) Field of Classification Search
CPC .......................... G06F 11/3664; G06F 16/957
USPC .......................................................... 714/38.1
See application file for complete search history.

(56) References Cited

U.S. PATENT DOCUMENTS

| | | | |
|---|---|---|---|
| 2010/0169792 A1* | 7/2010 | Ascar | G06F 11/3438 715/744 |
| 2014/0208231 A1* | 7/2014 | Chung | H04L 67/535 715/753 |

\* cited by examiner

*Primary Examiner* — Yair Leibovich
(74) *Attorney, Agent, or Firm* — Payam Moradian

(57) ABSTRACT

Optimized modification of a website based on user interactions with the website may include collecting data associated with the interactions and determining a success or failure of each interaction. A configuration of the website may be modified based on the success or failure of at least one user interaction. The modified website may be presented to a specified number of test users and, for each test user or test user session, a success or failure of each of the test user's interactions with the modified website may be determined. The modified configuration may be deemed successful based on a threshold number of the test user interactions having been determined to be successful. Elements of the website (e.g., a link or a search input box) may then be modified based on the modified configuration having been determined to be successful.

19 Claims, 16 Drawing Sheets

OPTIMIZED MODIFICATIONS TO A WEBSITE

CROSS-REFERENCE

The present application claims the benefit of U.S. provisional patent application No. 63/308,935, filed on Feb. 10, 2022, and U.S. provisional patent application No. 63/325,575, filed on Mar. 30, 2022, both of which are incorporated by reference herein in their entirety.

FIELD

The present disclosure generally relates to methods and systems for optimized modification of a website based on user interactions, and more particularly to methods and systems for modifying the website based on a success or failure of the user interactions.

BACKGROUND

The operators of a website may benefit from optimizing the website's user experience to yield successful user interactions, whether it be to achieve a "conversion" (such as checking out a shopping cart or submitting a contact form) or to get a support or customer service question answered. Website operators may consult web analytics systems, such as Google Analytics, to learn how to take manual actions to improve their websites based on analyzing the user's behavior (e.g., interactions) during their visit to the website.

The content, layout and/or user interaction sequences provided by a website may significantly affect the way in which users interact with the website so that even small changes to, for example, the layout, the graphics, or the user interface (UI) for interacting with website content may have an impact on website "performance." The performance of the website may be determined, for example, based on factors such as: how long the user remains viewing a web page, how likely it is that the user will progress to other web pages of the website, or select links within a web page of the website, or view or purchase something on the website.

Therefore, modifying or altering aspects of the website and then measuring how these changes impact the website's performance may be useful for optimization of the website performance. For example, web pages of the website may be modified for better performance with respect to clusters of users (e.g., user segmentation) and/or for better performance with respect to user behavior patterns (e.g., user behavioral targeting). These modifications may cause variances in the user's experiences, behavioral responses and subsequent conversion rates for the website. The conversion rates may be measured, for example, based on the number of user objectives (e.g., making a purchase or submitting a form) that are achieved with a specific website configuration divided by the number of times the specific website configuration has been made available to the users.

Optimization of a website may require a website optimization system including a remote computer programmed to interact with the server(s) hosting the web pages of the website. The interaction may require specific programming (e.g., JavaScript) directed to individual web pages of the website in order to modify and then test the individual web pages. This method of interaction may be overly complex and also time consuming because it requires custom programming for modifying each web page and also for testing each webpage. Although such custom programming allows for the data, and/or functions, and/or content on each web page of the website to be altered and optimized, it may also result in significantly inflated human resource requirements and it may also limit the speed at which website modifications may be deployed. Additionally, any custom programming may need to be removed after a modification/testing process has been completed so that another such process may begin on the same web page(s) of the website. These time and resource constraints may result in relatively high costs and extended timeframes for deployment of website modifications, both of which may have to be considered when weighing the costs and benefits of website optimization programs.

DETAILED DESCRIPTION

The optimized modification of websites, as described herein, may include three major steps: 1) determining successful and failed user interactions with a website from collected behavioral data associated with the user or a with a website browsing session; 2) implementing a system to experiment with configurations of the website that may alter the user's behavior and/or the website browsing session; and 3) using the success and/or failure data for the user interactions to optimize modifications of the website for improvement of the user experience.

In order to optimize website improvement based on analyzing user behavior, the user behavior analytics may require several data processing steps:

A data collection step may employ web analytics systems to collect user behavior data, but these systems may not allow access to the user behavior data at the fine-grained level that may be required to detect successful user behavior patterns when interacting with the website. Therefore, the user behavioral data may be collected directly by a plugin (e.g., using JavaScript code) loaded when a web page of the website is first displayed to the user. A plugin may be a computer program that adds new functions to the website (e.g., collecting data associated with user interactions with the website) without altering any of the website's programming.

A data analysis step may follow once the user behavioral data has been collected. The user behavioral data may be analyzed by the system to divide the data into distinct types of user interactions, such as browsing sessions, or searches. In addition, this automated analysis step may also include determining which data may potentially distinguish a successful user interaction with the website from an unsuccessful user interaction with the website.

A scoring and tuning step may include calculating several forms of the success and failure data and fine-tuning the data because different success metrics (as explained more fully below) may be useful for different website improvement/optimization techniques.

Throughout this disclosure, the term "website" may refer generally to the standard configuration website presented to users and/or the modified configuration website presented to test users for determining a success or failure of the modified configuration.

Throughout this disclosure, the term "user interaction" may refer generally to a user's interaction with the standard configuration website and/or a test user's interaction with the modified configuration website.

Figure 1:
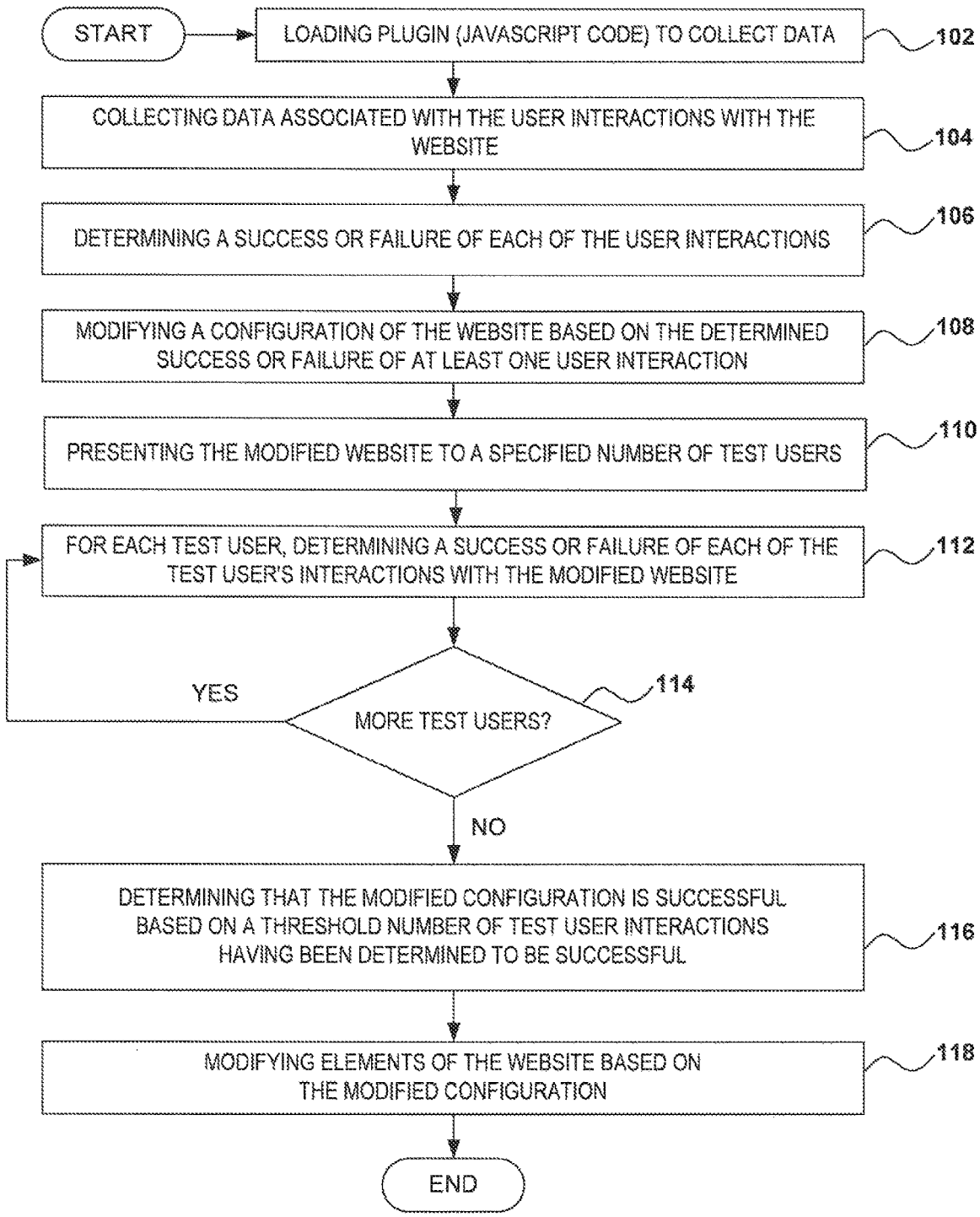
FIG. 1 is a flow diagram illustrating a method for optimized modification of a website based on user interactions with the website, according to embodiments of the present disclosure.

FIG. 1 is a flow diagram illustrating a method 100 for optimized modification of a website based on user interactions with the website, according to some embodiments of the present disclosure. Method 100, as well as the methods 200-1500 described below with respect to FIGS. 2-15, may be performed by a system including processing devices that may comprise hardware (e.g., circuitry, dedicated logic), computer readable instructions (e.g., run on a general purpose computer system or a dedicated machine), or a combination of both, such as computer system 1600 as described below with respect to FIG. 16.

The method 100 may start and include the following:

At operation 102, loading a plugin (e.g., JavaScript code) to collect data associated with user interactions with the website, such as, links clicked, web pages (e.g., Uniform Resource Locators or URLs) visited, etc. In some embodiments, the plugin may be loaded on each web page of the website when the user first visits the web page.

At operation 104, collecting data associated with the user interactions with the website. As noted above, this may be accomplished via the loading of the plugin (e.g., JavaScript code). The collected data may include, for example, any related timings (e.g., for each user/test user session as explained below with respect to method 200 of FIG. 2), scrolls and pauses, cursor movement, resizing windows, keyed input into forms, clicks on links, clicks on buttons, clicks on a browser back button, switching active browser tabs, exiting an area of the website and/or exiting the website entirely.

At operation 106, determining a success or failure of each of the user interactions. Once the user behavioral data have been collected for the interactions on each webpage of the website, the behavior patterns may be analyzed to discern successful and unsuccessful patterns. In some embodiments, the behavior patterns may not be associated with any personally-identifiable information (PII), in order to conform to privacy regulations that may exist in certain legal jurisdictions. The behavior patterns may be characterized as signals of success or signals of failure based on, for example, comparison to historical website data regarding the success or failure of similar user interactions. For example, the success or failure of a user interaction may be based on whether a desired task has been completed, a specified link has been clicked, and/or a threshold amount of time has been spent viewing a web page of the website.

In some embodiments, content links (hypertext links in the primary content area of each page) may be distinguished from boilerplate links (hypertext links in the header, footer, or other elements common to every web page (or many web pages) of the website in order to determine the success or failure of the clicks. For example, a click on a navigation link in a boilerplate area of a web page may be interpreted as a user's desire to leave this area of the website, which may therefore be viewed as an unsuccessful user interaction with the website.

At operation 108, modifying a configuration of the website based on the determined success or failure of at least one user interaction. This may include modifying at least one of: an appearance of a search input box or search results page, pages curated to specific keywords, weights used to rank search algorithms, use of multiple search algorithms and use of synonyms, navigation links, navigation menus, sub-menus, and/or footer sections. For example, the success of a user interaction may result in a specific element of the website configuration being used more often whereas the failure of the same user interaction may result in the decreased use of that element of the website configuration. Throughout this disclosure, the term "keyword" may refer to all of the characters typed into a search box and may contain spaces and/or be more than one English (or other language) word. The modifications to the configuration of the website may be implemented automatically by a website optimization system or they may be provided by a website administrator or by another source.

At operation 110, presenting the modified website to a specified number of test users. In a website configuration testing mode the website may have two (e.g., or more) distinct configurations for presenting to users visiting the website. A standard (e.g., unmodified) website configuration may be presented to a first group of users that are not being used to test the modified website configuration and a test (e.g., modified) website configuration may be presented to a second group of test users that are being used to test the modified website configuration. In some embodiments, this testing mode may include increasing the number of test users based on a success of test user interactions with the modified website.

At operation 112, for each test user, determining the success or failure of each of the test user's interactions with the modified website. As noted above with respect to operation 106, the user behavioral data may be collected for the test user interactions on each webpage of the modified website and the test user behavior patterns may be analyzed to discern successful and unsuccessful patterns. The test user behavior patterns may be characterized as signals of success or signals of failure based on, for example, comparison to historical website data regarding the success or failure of similar user and/or test user interactions. As noted above, the success or failure of a test user interaction with the modified website configuration may be based on, for example, whether a desired task has been completed, a specified link has been clicked, and/or a threshold amount of time has been spent viewing a web page of the website.

At operation 114, based on more test users being available returning to operation 112 (e.g., to determine the success or failure of each of the remaining test user's interactions with the modified website), and based on no more test users being available (e.g., the specified number of test users has already visited the modified website) continue to operation 116 to determine whether the modified website configuration has been successful (e.g., as described below).

At operation 116, determining that the modified configuration is successful based on a threshold number of test user interactions having been determined to be successful. For example, it may be determined whether a particular element of the modified website (e.g., a specific link that is not present in the standard website) is associated with a threshold level of success or failure (e.g., a score based on how many times the specific link has been clicked) within a threshold period of time (e.g., more time may be allowed for lower traffic websites). The score that must be achieved by a particular element of the modified website in order to be considered successful may be based on historical data regarding similar elements (e.g., links) that have been presented to users (and/or test users) in the past. Furthermore, the threshold period of time for achieving the successful score may be based on historical data regarding how many views a website gets per hour, day, month etc. The threshold period of time may then be specified based on a desired number of test users for viewing the particular element of the modified website during a "test" of the modified configuration. A combined score for all of the modified elements of the modified configuration of the website may then be determined and compared to a specified threshold score for a successful modified website configuration (e.g., based on historical data associated with user interactions with the website)

At operation 118, modifying elements of the website (e.g., a link on the standard website with the unmodified configuration) based on the modified configuration. Modifying elements of the standard website may include modifying at least one of: keywords presented to a searcher based on an incomplete input keyword, order of keywords presented to a searcher based on an input keyword, web pages presented to a searcher based on an input keyword, order of web pages presented to a searcher based on an input keyword, navigation links, navigation menus, sub-menus, and/or footer sections that are associated with successful user interactions during the testing of the modified website configuration (e.g., associated with a score that indicates a threshold level of success as described above with respect to operation 116). The modifications to the elements of the website may be implemented automatically by a website optimization system or they may be provided by a website administrator or by another source.

The method 100 may then end.

Figure 2:
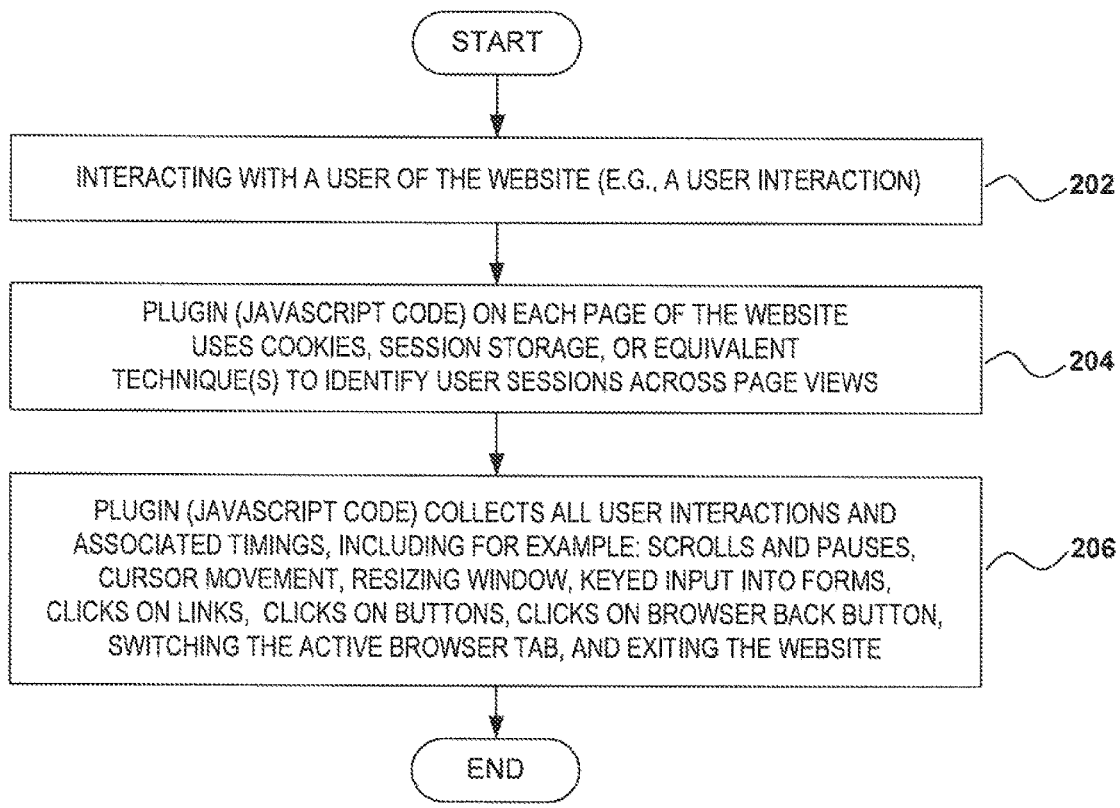
FIG. 2 is a flow diagram illustrating a method for collecting data associated with the user interactions with the website, according to some embodiments of the present disclosure.

FIG. 2 is a flow diagram illustrating a method 200 for collecting data associated with the user interactions with the website (e.g., the modified website), according to some embodiments of the present disclosure. As noted above, with respect to operations 102 and 104 of method 100 of FIG. 1, the optimized modification of a website may begin with the collection of data associated with user interactions with the website (e.g., links clicked, web pages visited, etc.) The method 200 may start and include the following:

At operation 202, interacting with a user of the website (e.g., links are clicked by the user, web pages are viewed by the user, etc.) The collection of data associated with user interactions with the website may begin based on an initial type of user interaction with the website which may be specified for each testing of a modified website configuration, for example, a first time a user visits a web page of the modified website.

At operation 204, identifying user sessions across web pages of the website using cookies, session storage or other similar techniques. A user session may refer to a sequence of user interactions with the website that are performed by the same user during a limited period of time (e.g., a specified period of time or a period of time that ends when a specified user action is detected, such as leaving the website). As noted above, this may be accomplished via the loading of the plugin application (e.g., JavaScript) on each webpage of the website.

At operation 206, collecting data associated with all user interactions and related timings (e.g., for each user/test user session), including for example: scrolls and pauses, cursor movement, resizing windows, keyed input into forms, clicks on links, clicks on buttons, clicks on a browser back button, switching active browser tabs and/or exiting the website.

The method 200 may then end.

Figure 3:
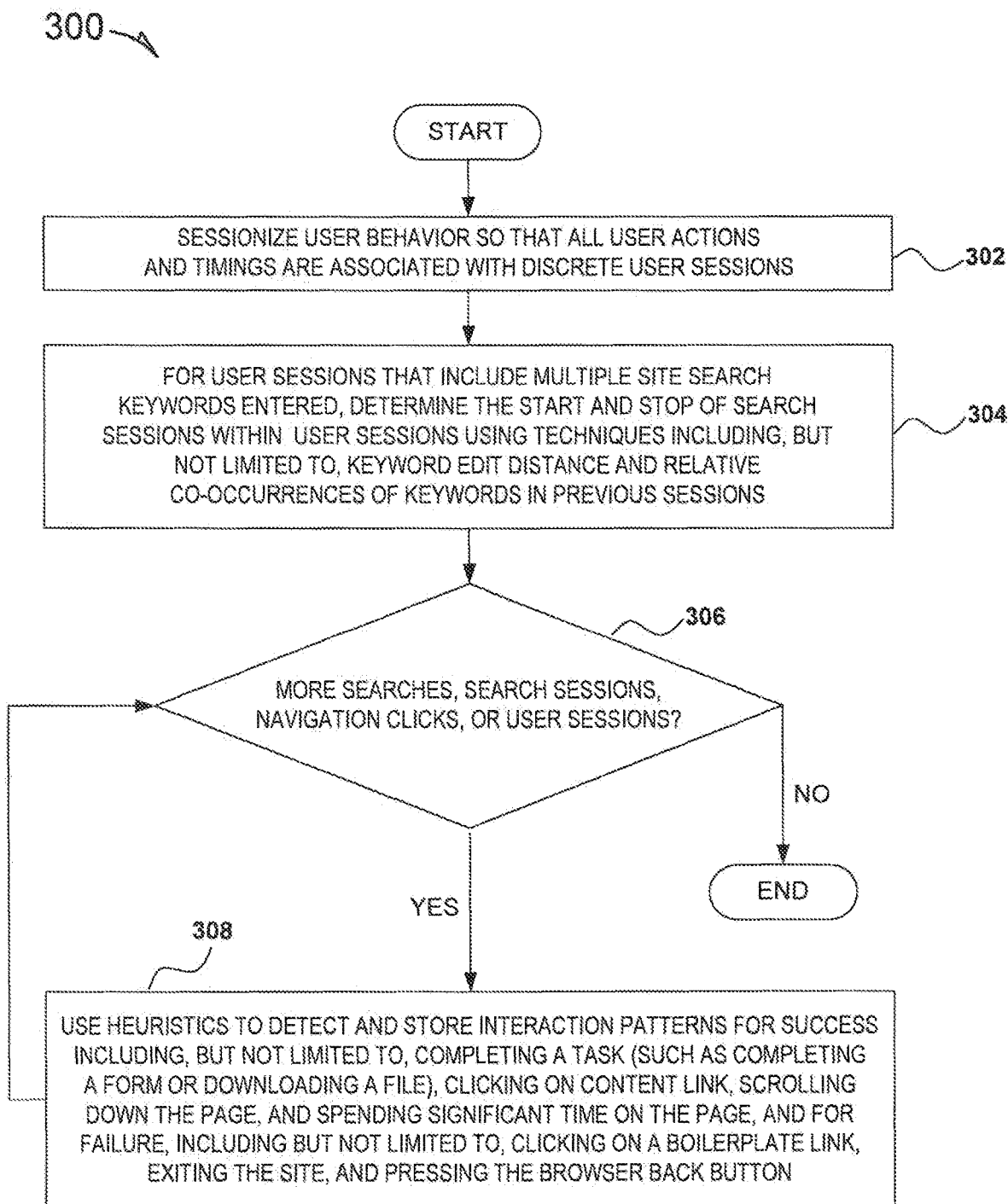
FIG. 3 is a flow diagram illustrating a method for analyzing the data associated with user interactions with the website, according to some embodiments of the present disclosure.

FIG. 3 is a flow diagram illustrating a method 300 for analyzing the data associated with user interactions with the website, according to some embodiments of the present disclosure. As noted above with respect to operation 106 of method 100 of FIG. 1, the optimized modification of a website configuration may include determining a success or failure of each of the user interactions based on user behavioral data that (e.g., associated with the user interactions with the website) may be analyzed to discern successful and unsuccessful patterns.

The method 300 may start and include the following:

At operation 302, grouping user interactions into sessions so that all of the user's interactions and timings (e.g., relative timing information associated with the user interactions, such as time between clicks etc.) are associated with discrete user sessions. As noted above, a user session may refer to a sequence of user interactions with the website that are performed by the same user during a specified/limited period of time.

At operation 304, for user sessions that include multiple site search keywords entered, determining the start and stop of search sessions within the user sessions. This may be accomplished by techniques including keyword edit distance (e.g., based on a minimum number of edits needed to transform one keyword string into another) and/or relative co-occurrences of keywords in previous sessions (e.g., based on historical data regarding keywords that are often used together in one keyword search).

At operation 306, based on more user interactions (such as a search, a search session, a navigation click, or a user browsing session) being available, proceeding to operation 308 and based on no more user interactions being available ending the method 300.

At operation 308, heuristics (e.g., methods derived from previous experiences with similar problems) may be used for detecting and storing user interaction patterns associated with success and user interaction patterns associated with failure. As noted above, historical data regarding user interactions with the website may be used to determine whether a user interaction is a success. For example, the historical data may indicate that success may be based on criteria, such as, a task having been completed, a specified link having been clicked, and/or a threshold amount of time having been spent on a web page of the website, whereas failure may generally be based on the opposite criteria (e.g., a specified link has not been clicked).

Figure 4:
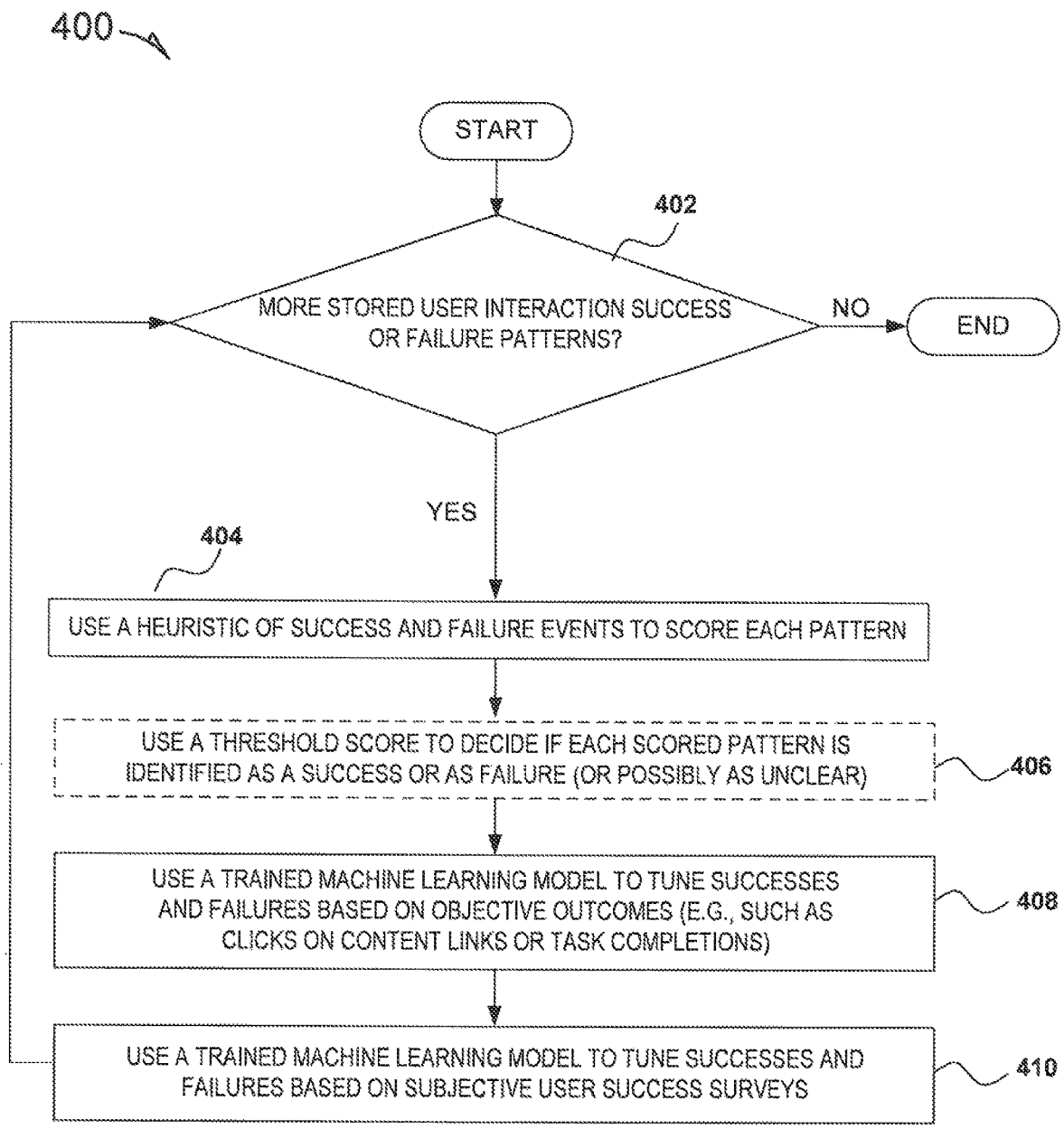
FIG. 4 is a flow diagram illustrating a method for scoring and/or tuning the user interactions based on the collected data, according to embodiments of the present disclosure.

FIG. 4 is a flow diagram illustrating a method 400 for scoring and/or tuning the user interactions based on the collected data, according to embodiments of the present disclosure. As noted above with respect to operation 116 of method 100 of FIG. 1, the level of success or failure of a user interaction with the website may be measured with a score associated with the user interaction over a threshold period of time.

Once the patterns of success or failure are identified for the user interactions, they may be scored to indicate how successful or unsuccessful they are, and they may be further tuned with machine learning models based on objective or subjective outcomes as explained below. The machine learning model may be a program that finds patterns and/or makes decisions based on a previously unseen dataset (e.g. tuning the scored user interactions with the website).

The method 400 may start and include the following:

At operation 402, based on more user interaction patterns being available (e.g., from method 300 of FIG. 3) proceeding to operation 404 and based on no more user interaction patterns being available ending the method 400.

At operation 404, heuristics may be used for determining a level of success or failure of a user interaction pattern (e.g., at operation 308 of method 300 of FIG. 3). The level of success or failure of the user interaction pattern may be indicated by a score, as described above with respect to operation 116 of method 100 of FIG. 1.

At operation 406, optionally, the score associated with each user interaction pattern may be compared to a specified threshold success or failure score in order to determine if the user interaction pattern is associated with a success or whether it is associated with a failure (or even possibly determined to be unclear regarding success or failure).

At operation 408, using a trained machine learning model to tune the success and failure patterns based on objective outcomes (e.g., a specified number of clicks on content links or a specified number of task completions). In this way, the success or failure of user interaction patterns may be modified based on new conditions that require a modification to the level of success that would be attributed to the user interaction patterns based on historical data. For example, a user interaction pattern that would be deemed a failure based on historical data from an earlier time period during which the number of website users was larger may still be considered a success based on specified objective outcomes (e.g., a specified number of clicks on content links of the website) that are more indicative of a current state of the website.

At operation 410, using a trained machine learning model to tune the success and failure patterns based on subjective outcomes (e.g., user surveys regarding success or failure of user interactions with the website). As noted above with respect to operation 408, this may allow the success or failure of user interaction patterns to be modified based on new conditions that require a modification to the level of success that would be attributed to the user interaction patterns based on historical data.

Once the historical success and failure patterns of the user interactions are scored and tuned, they may be applied to experiments that test the configurations of both site search and content recommendations, as well as used to set the parameters for various other automated improvements discussed later in this disclosure. Any of the above described metrics, models, or heuristics may be used as the basis for optimized modifications to elements of the website.

Figure 5:
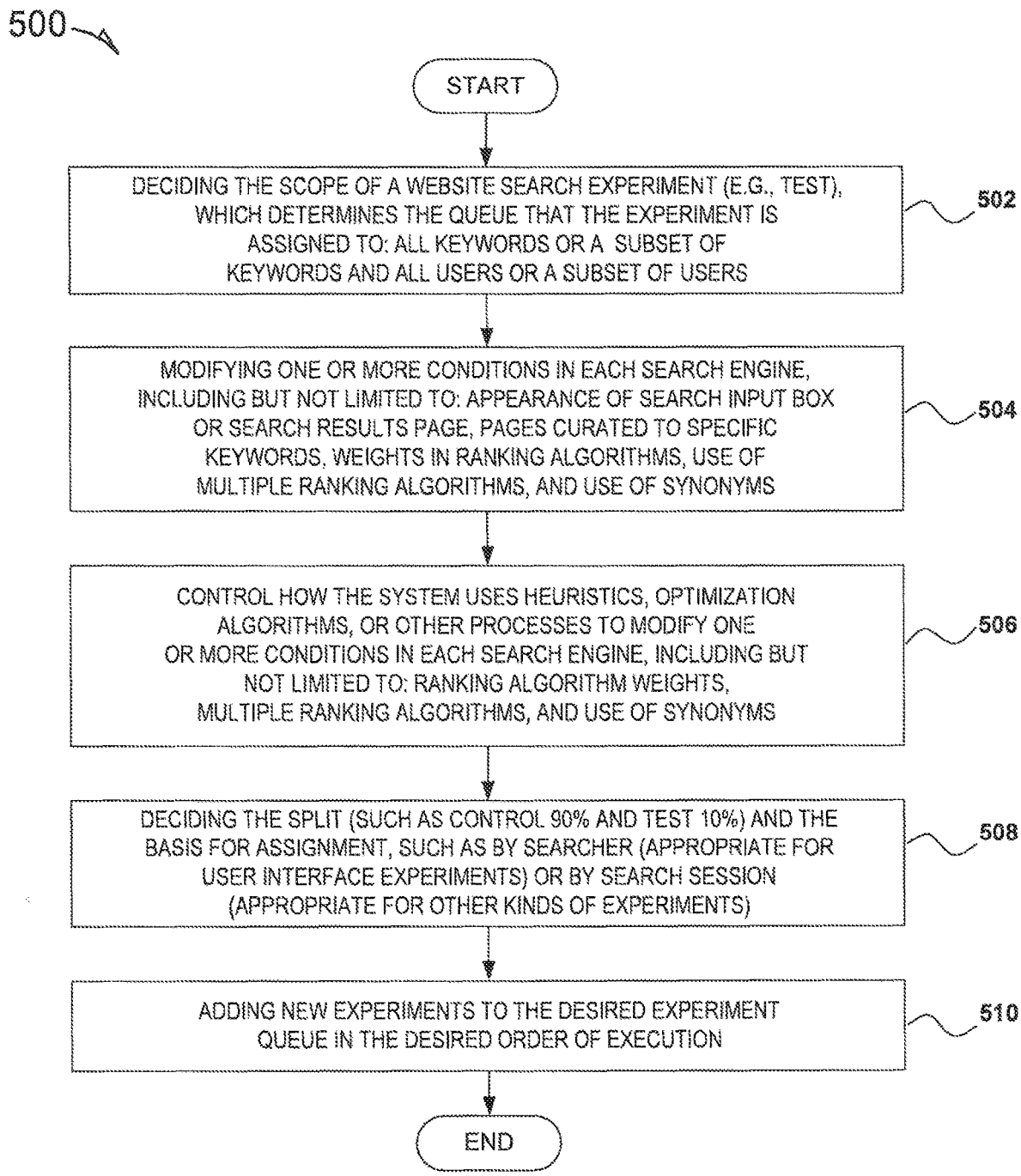
FIG. 5 is a flow diagram illustrating a method for generating a website search test based on modifying a configuration of the website, according to embodiments of the present disclosure.

FIG. 5 is a flow diagram illustrating a method 500 for generating a website search test based on modifying a configuration of the website, according to embodiments of this disclosure.

The method 500 may start and include the following:

At operation 502, determining a scope of an experiment (e.g., a test), which may determine a specific queue to which the experiment is assigned. For example, the experiments may be queued by human website operators (or automatically by the website optimization system) for later execution based on: all keywords used for website searches or a subset of the keywords, and based on: all website users or a subset of the users.

At operation 504, modifying a configuration of the website (e.g., search engines) based on the collected data associated with user interactions that are associated with website searches. In some embodiments the search engines may be modified based on other criteria, such as user specified modifications for the experiment. The modifying may include at least one of: an appearance of a search input box or search results page, pages curated to specific keywords, weights used to rank search algorithms, use of multiple search algorithms and use of synonyms.

At operation 506, determining heuristics and/or optimization algorithms (e.g., and/or other processes) used by the website to modify a configuration of the website (e.g., search engines). The modifying may include at least one of: ranking algorithm weights, multiple ranking algorithms and use of synonyms.

At operation 508, determining a portion/amount of the website (e.g., search engines) to be modified in order to test the modified configuration. For example, the website may be split into a 90% control portion (e.g., unmodified searches) and a 10% test version (e.g., with modified configuration for searching). Furthermore, the basis for assignment of a searcher to a search engine may be the searcher (e.g., for user interface experiments) or the search session (e.g., for other types of experiments).

At operation 510, the experiment may be placed into the appropriate queue for execution. As noted above at operation 502, the appropriate queue for execution may be determined based on the scope of the experiment: all keywords used for website searches or a subset of the keywords, and: all website users or a subset of the users.

The method 500 may then end.

Figure 6:
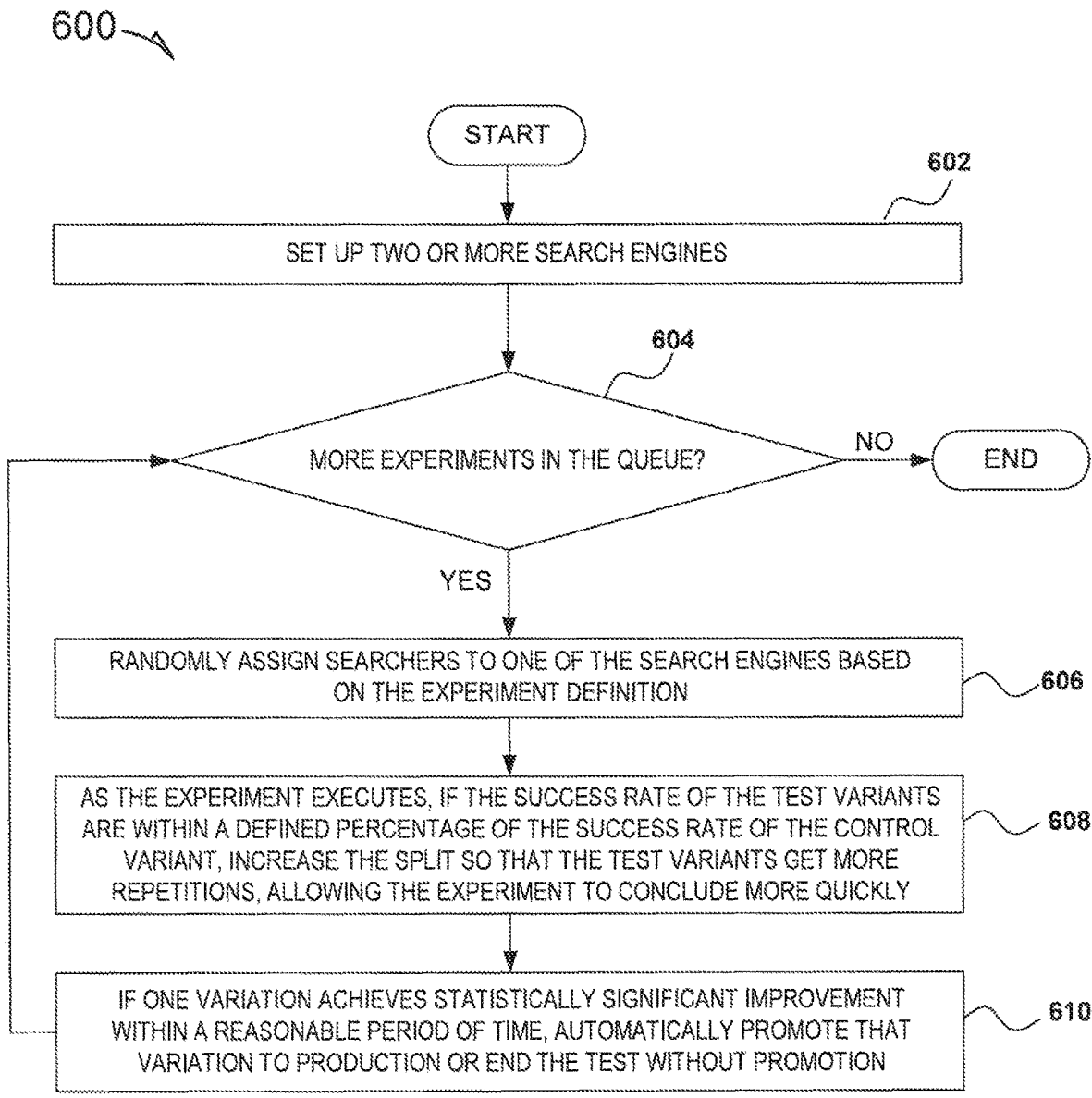
FIG. 6 is a flow diagram illustrating a method for executing the website search test, according to some embodiments of the present disclosure.

FIG. 6 is a flow diagram illustrating a method 600 for executing the website search test, according to some embodiments of the present disclosure. In some embodiments, the website search test may be designed as described above with respect to method 500 of FIG. 5.

The method 600 may start and include the following:

At operation 602, setting up two or more search engines for the website search test (e.g., according to operations 504 to 508 of method 500 of FIG. 5).

At operation 604, based on more experiments being available in the appropriate queue (e.g., as described above with respect to operation 510 of method 500 of FIG. 5) proceeding to operation 606 and based on no more experiments being available in the appropriate queue ending the method 600.

At operation 606, randomly assigning searchers to one of the search engines based on the experiment parameters. As noted above with respect to operation 508 of method 500 of FIG. 5, the basis for assignment of a searcher to a search engine may be the searcher (e.g., for user interface experiments) or the search session (e.g., for other types of experiments).

At operation 608, during execution of the experiment, increasing the portion/amount of the website to be modified (e.g., the split described above with respect to operation 508 of method 500 of FIG. 5) in order to test the modified configuration more quickly based on a comparison between the success rate of elements of the modified portion/amount of the website and the success rate of elements of the unmodified portion/amount of the website (e.g., it may be determined whether the success rates are within a specified percentage of each other).

At operation 610, based on an element of the modified portion/amount of the modified website having success that is greater than a threshold value within a threshold amount of time (e.g., an appearance of a search input box that increased the number of searches performed on the website by a sufficient amount over a specified period of time) including the element (e.g., the appearance of the search input box) in the unmodified website. The method 600 may then return to operation 604 as described above.

Figure 7:
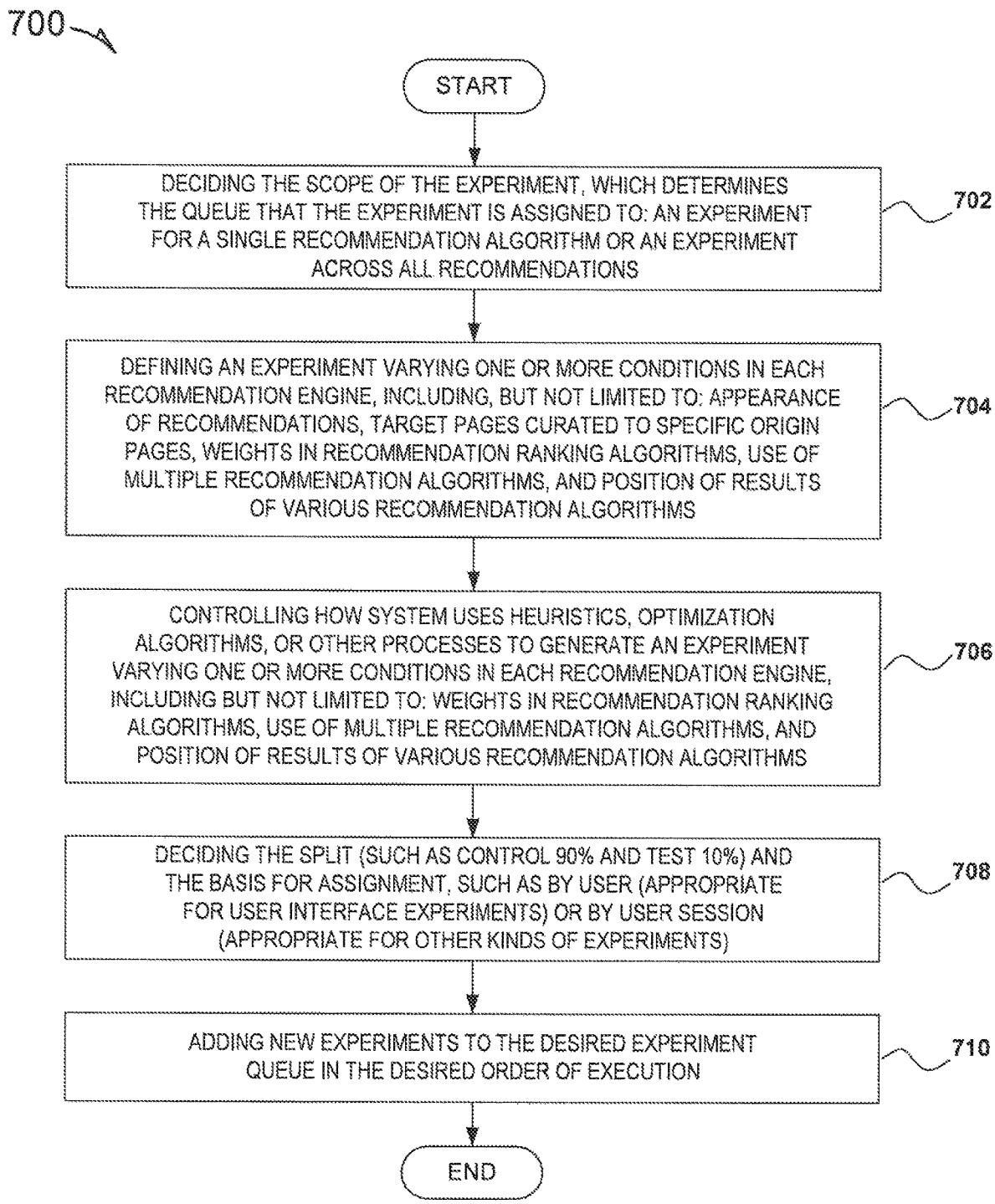
FIG. 7 is a flow diagram illustrating a method for generating a website content recommendation test based on modifying a configuration of the website, according to some embodiments of the present disclosure.

FIG. 7 is a flow diagram illustrating a method 700 for generating a website content recommendation test based on modifying a configuration of the website, according to some embodiments of the present disclosure.

The method 700 may start and include the following:

At operation 702, determining a scope of a website content recommendation experiment (e.g., test), which may determine a queue to which the experiment is assigned to. For example, the experiments may be queued by human website operators (or automatically by the website optimization system) for later execution based on a single recommendation algorithm or based on all recommendations.

At operation 704, modifying a configuration of the website (e.g., recommendation engines) based on the collected data associated with user interactions (e.g., associated with content recommendations). In some embodiments the recommendation engines may be modified based on other criteria, such as user specified modifications for the experiment. The modifying may include at least one of: an appearance of a recommendation, target pages curated to specific origin pages, weights used to rank recommendation algorithms, use of multiple recommendation algorithms and position of results of various recommendation algorithms.

At operation 706, determining heuristics and/or optimization algorithms (e.g., and/or other processes) used by the website to modify a configuration of the website (e.g., recommendation engines). The modifying may include at least one of: weights used to rank recommendation algorithms, use of multiple recommendation algorithms and position of results of various recommendation algorithms.

At operation 708, determining a portion/amount of the website (e.g., recommendation engines) to be modified in order to test the modified configuration. For example, the website may be split into a 90% control portion (e.g., unmodified recommendations) and a 10% test version (e.g., with modified configuration for recommendations). Furthermore, the basis for assignment of a user to a recommendation engine may be the user themselves (e.g., for user interface experiments) or the user's session (e.g., for other types of experiments).

At operation 710, the experiment may be placed into the appropriate queue for execution. As noted above at operation 702, the appropriate queue for execution may be determined based on the scope of the experiment: based on a single recommendation algorithm or based on all recommendations.

The method 700 may then end.

Figure 8:
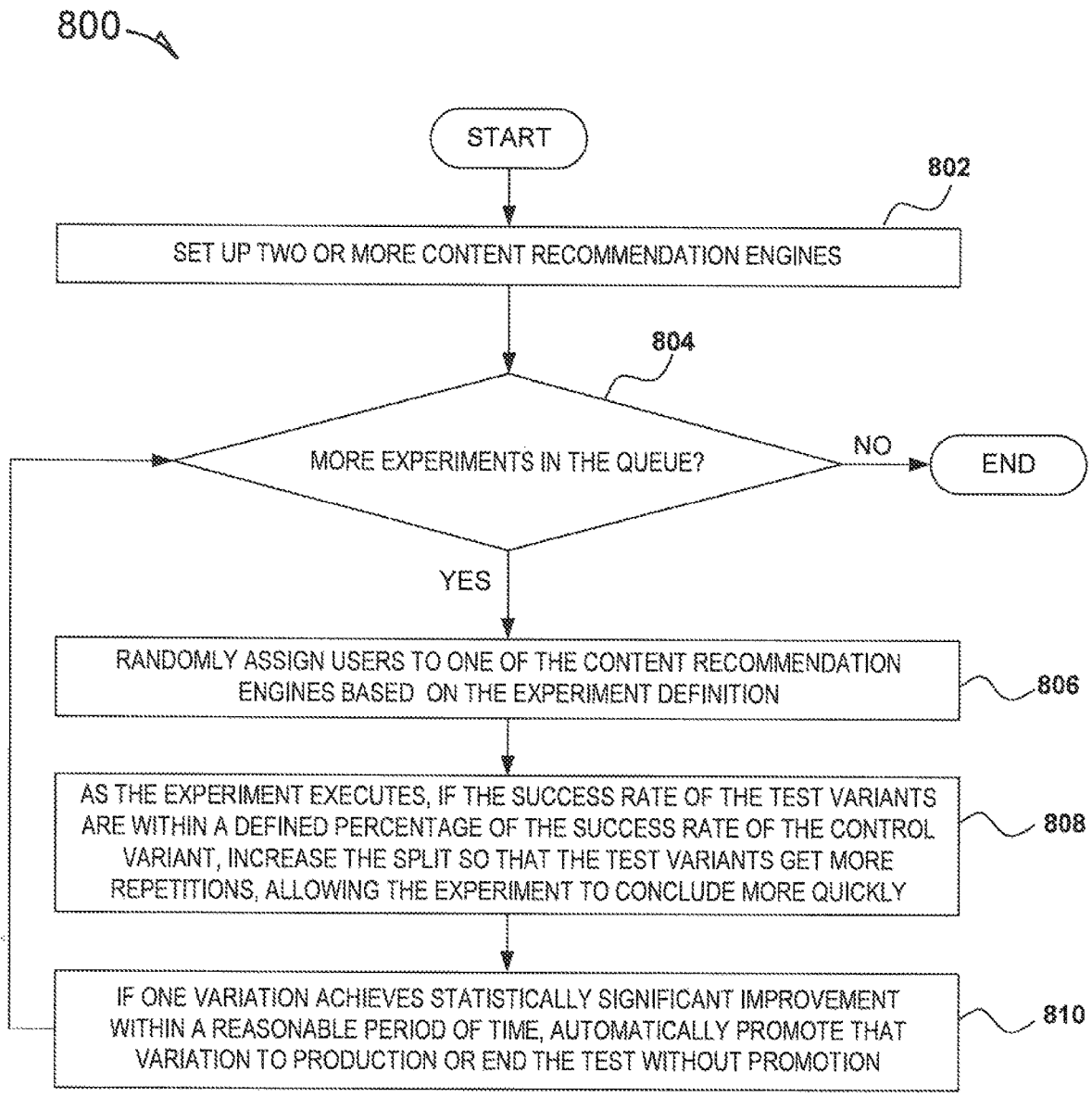
FIG. 8 is a flow diagram illustrating a method for executing the website content recommendation test, according to some embodiments of the present disclosure.

FIG. 8 is a flow diagram illustrating a method 800 for executing the website content recommendation test, according to some embodiments of the present disclosure.

The method 800 may start and include the following:

At operation 802, setting up two or more recommendation engines for the website test (e.g., according to operations 704 to 708 of method 700 of FIG. 7).

At operation 804, based on more experiments being available in the appropriate queue (e.g., as described above with respect to operation 710 of method 700 of FIG. 7) proceeding to operation 806 and based on no more experiments being available in the appropriate queue ending the method 800.

At operation 806, randomly assigning users to one of the recommendation engines based on the experiment parameters. As noted above with respect to operation 708 of method 700 of FIG. 7, the basis for assignment of a user to a recommendation engine may be the user (e.g., for user interface experiments) or the user's session (e.g., for other types of experiments).

At operation 808, during execution of the experiment, increasing the portion/amount of the website to be modified (e.g., the split described above with respect to operation 708 of method 700 of FIG. 7) in order to test the modified configuration more quickly based on a comparison between the success rate of elements of the modified portion/amount of the website and the success rate of elements of the unmodified portion/amount of the website (e.g., it may be determined whether the success rates are within a specified percentage of each other).

At operation 810, based on an element of the modified portion/amount of the modified website having success that is greater than a threshold value within a threshold amount of time (e.g., an appearance of recommendations that increased the number of user interactions with the website by a sufficient amount over a specified period of time) including the element (e.g., the appearance of the recommendations) in the unmodified website. The method 800 may then return to operation 804 as described above.

Furthermore, the history of success/failure on the website may be informed by the testing system to set parameters used to automate improvements in user experience for both site search and site navigation as described below: including keyword suggestion for site search, related searches for site search and ranking for both site search results and for content recommendations for navigation. For example, as a searcher types a keyword into the search input box, the system may use previous searcher histories to suggest keywords to search for, using both popularity (which keywords were typed most frequently) and success rate (which keywords resulted in searchers finding what they were looking for) to select the keywords for suggestion.

Figure 9:
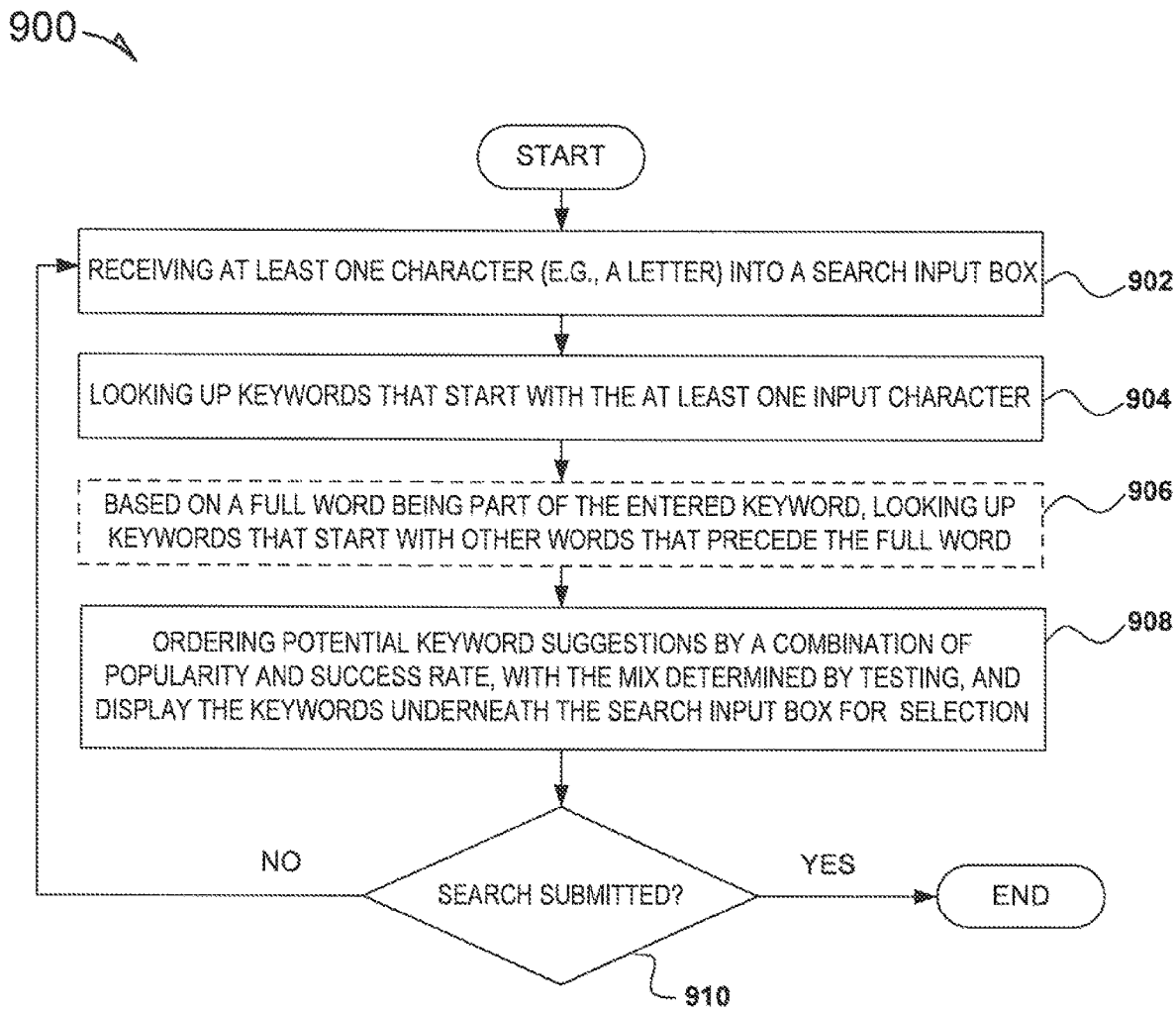
FIG. 9 is a flow diagram illustrating a method for determining keyword suggestions for a website search, according to some embodiments of the present disclosure.

FIG. 9 is a flow diagram illustrating a method 900 for determining keyword suggestions for a website search, according to some embodiments of the present disclosure.

The method 900 may start and include the following:

At operation 902, receiving at least one input character (e.g., letter or a symbol) from a searcher (website user using a search engine) into a search input box.

At operation 904, looking up keywords that start with the received at least one input character (e.g., words that begin with the letter "c" based on "c" being the received at least one input character).

At operation 906, based on the received at least one input character being a full word look up keywords that start with other words that precede the full word (e.g., look up the keyword "machine learning" based on "learning" being the received at least one input character).

At operation 908, ordering the looked up keywords based on popularity (which keywords were typed most frequently) and success rate (which keywords resulted in searchers finding what they were looking for) to select the keywords for suggestion and displaying the looked up keywords in order beneath the search input box for selection by the searcher.

At operation 910, based on the searcher selecting a keyword, submitting the search for execution and ending method 900 and based on the searcher not selecting any of the displayed keywords proceeding to operation 902 to receive further input from the searcher.

When the searcher submits a keyword to be found by the search engine, in addition to showing the list of pages (the search results), the system may also show a list of keywords that previous searchers have typed that are related to the keyword submitted and that also have high success rates based on the collected data associated with user interactions.

Figure 10:
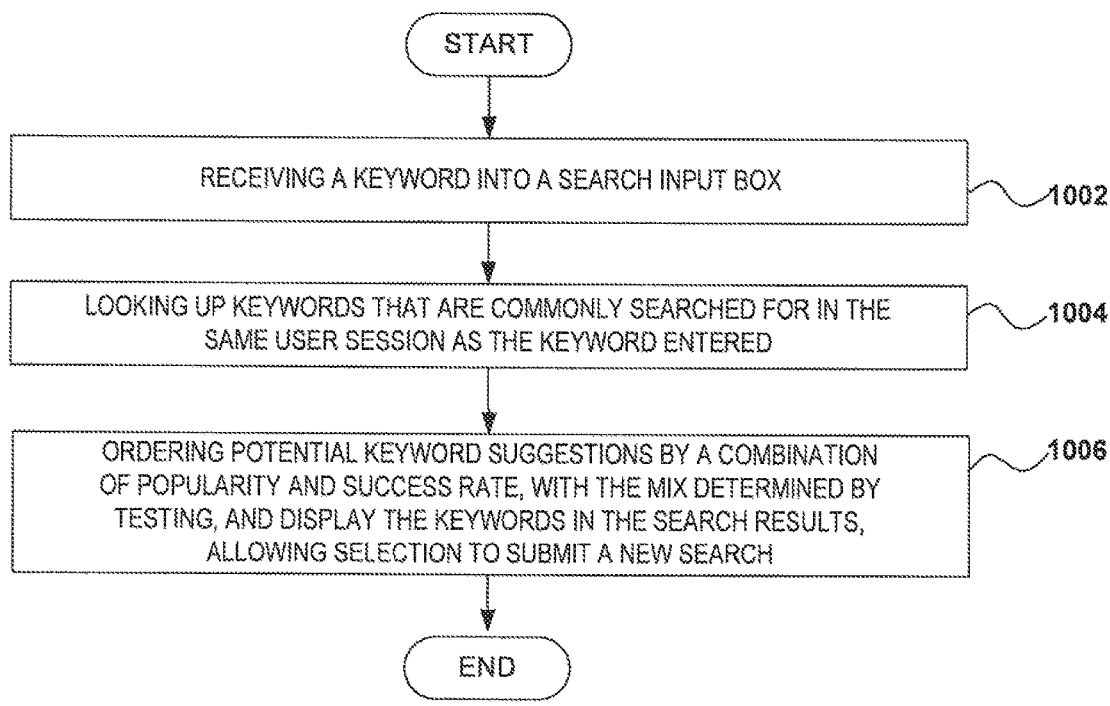
FIG. 10 is a flow diagram illustrating a method for determining keyword suggestions for a website search, according to some embodiments of the present disclosure.

FIG. 10 is a flow diagram illustrating a method 1000 for determining related searches for a website search, according to some embodiments of the present disclosure.

The method 1000 may start and include the following:

At operation 1002, receiving a keyword (e.g., any characters including spaces and/or more than one English or other language word) from a searcher typed into a search input box.

At operation 1004, looking up related searches that are commonly searched for in a same user session that includes a search for the input keyword (e.g., based on historical data).

At operation 1006, ordering the determining related searches based on popularity (which keywords were typed most frequently) and success rate (which keywords resulted in searchers finding what they were looking for) to select the related searches for suggestion and displaying the looked up keywords in order for the searcher.

The method 1000 may then end.

Success rates may be used in different ways to improve the results ranking for site searches, for example a rules-based approach or a machine learning approach. In the rules-based approach a website operator may determine/specify the rules used to process the success data in order to determine which web pages (e.g., which URLs) may lead to a successful user interaction when presented to a searcher for an input keyword.

Figure 11:
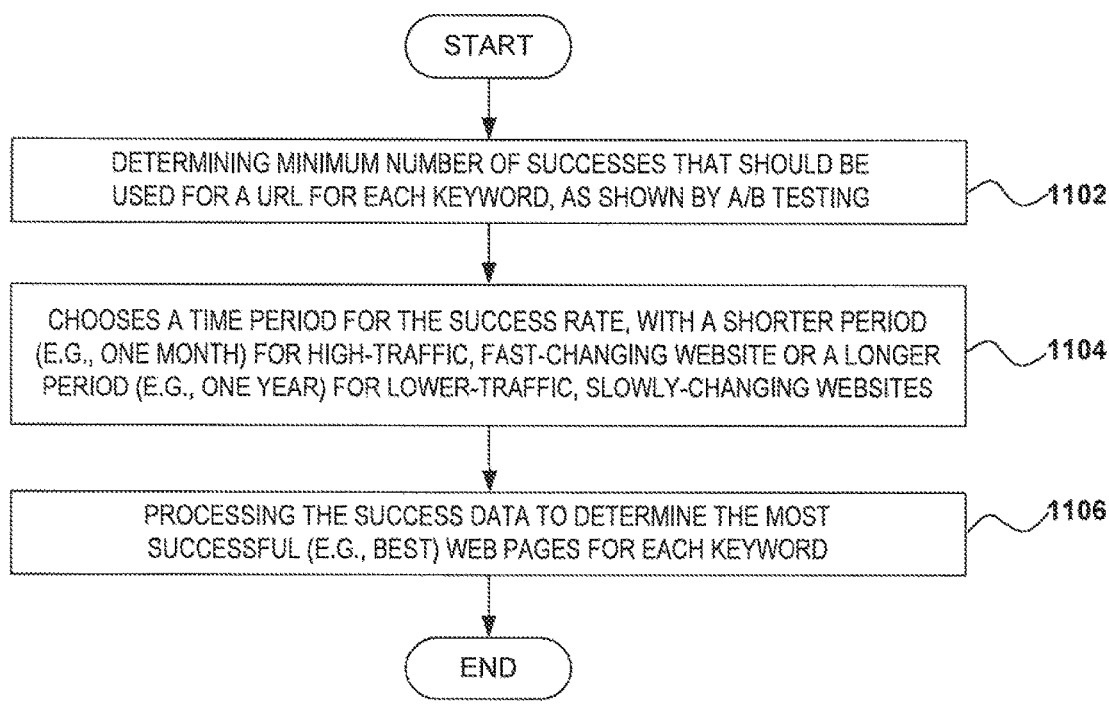
FIG. 11 is a flow diagram illustrating a method for determining web page suggestions for a website search, according to some embodiments of the present disclosure.

FIG. 11 is a flow diagram illustrating a method 1100 for determining web page suggestions for a website search, according to some embodiments of the present disclosure.

The method 1100 may start and include the following:

At operation 1102, determining a minimum number of successes that should be used for a web page for each input keyword according to the experiments performed (e.g., A/B testing results from comparing two different versions of the web page in order to determine which version generates more conversions.)

At operation 1104, determining a time period associated with the successes (to determine a success rate), with a shorter period of time (e.g., one month) for high traffic and/or faster changing websites and a longer period of time (e.g., one year) for lower traffic and/or more slowly changing websites.

At operation 1106, processing the success data to determine the most successful (e.g., best) web pages to present for each input keyword.

The method 1100 may then end.

Figure 12:
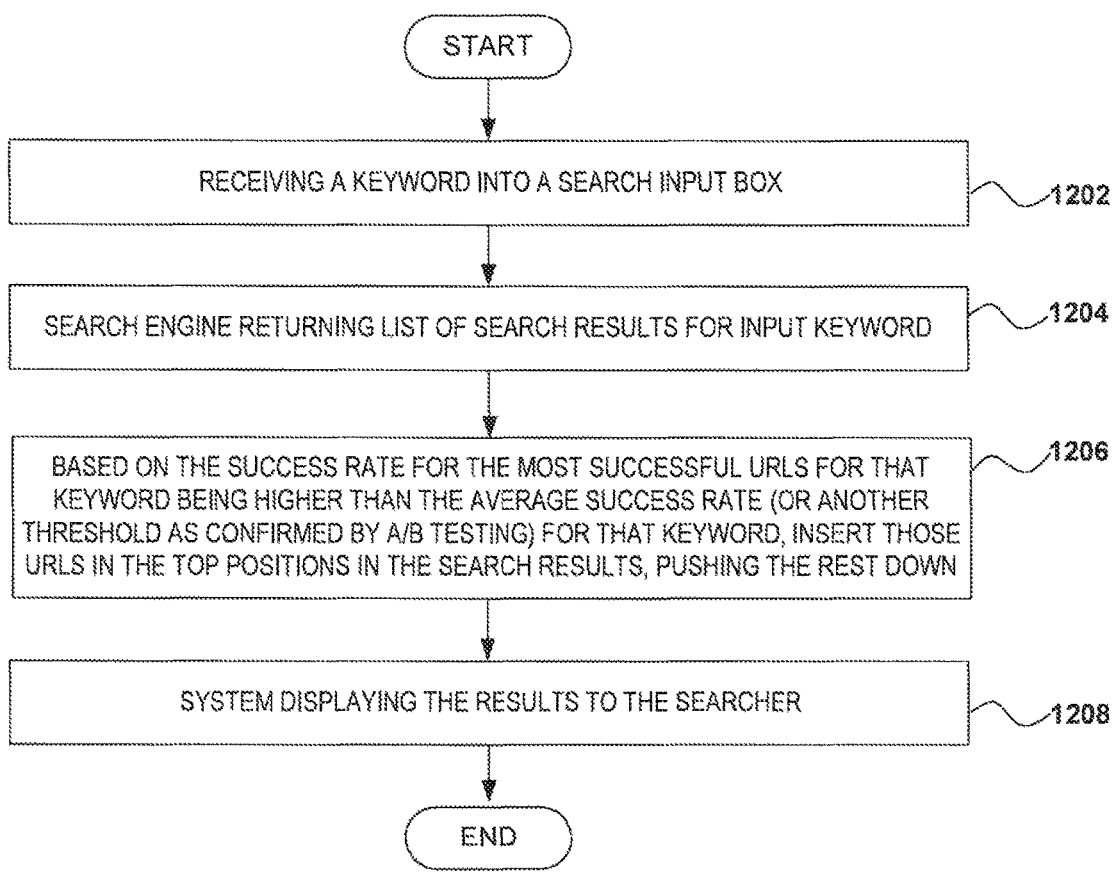
FIG. 12 is a flow diagram illustrating a method for determining web page suggestions for a website search, according to some embodiments of the present disclosure.

FIG. 12 is a flow diagram illustrating a method 1200 for determining web page suggestions for a website search, according to some embodiments of the present disclosure.

The method 1200 may start and include the following:

At operation 1202, receiving a keyword (e.g., any characters including spaces and/or more than one English or other language word) from a searcher into a search input box.

At operation 1204, the search engine returns a list of search results for the input keyword (e.g., based on one or more search algorithms).

At operation 1206, ordering the search results based on the most successful web pages (e.g., URLs) with success rates that are higher than the average success rate for the input keyword (e.g., based on historical data) or based on another threshold as indicated by A/B testing being placed in the top positions in the presented search results and pushing the rest of the search results down the list of the presented search results.

At operation 1208, presenting the ordered search results to the searcher.

The method 1200 may then end.

Figure 13:
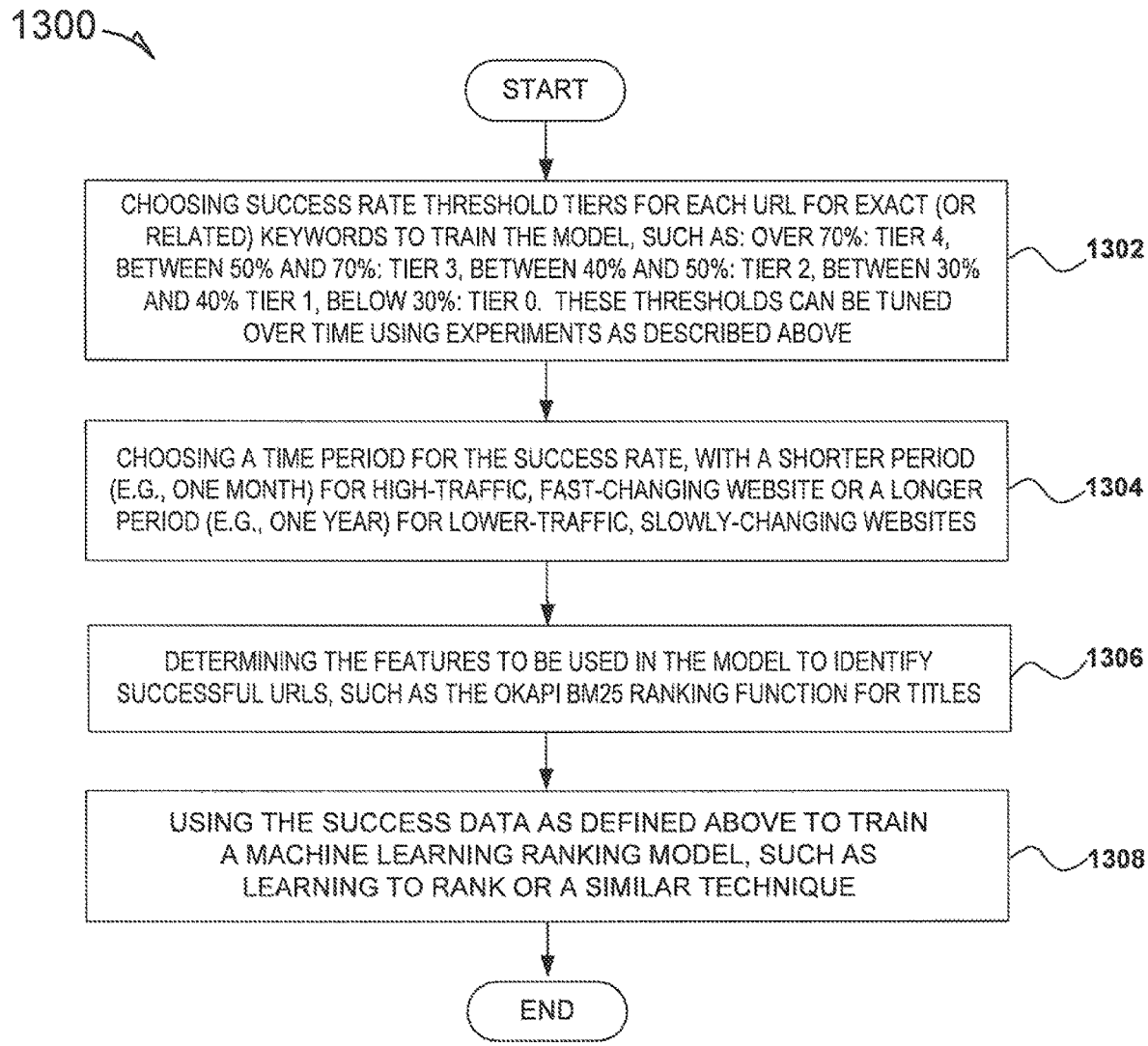
FIG. 13 is a flow diagram illustrating a method for tuning the web page suggestions based on a machine learning model, according to embodiments of the present disclosure.

FIG. 13 is a flow diagram illustrating a method 1300 for tuning the web page suggestions based on a machine learning model, according to embodiments of the present disclosure.

The method 1300 may start and include the following:

At operation 1302, for each webpage, determining a success rate threshold tier for each keyword or related keywords. For example, the machine learning model may be trained based on tiers as follows: over 70%: Tier 4, between 50% and 70%: Tier 3, between 40% and 50%: Tier 2, between 30% and 40%: Tier 1, and below 30%: Tier 0. As noted above with respect to machine learning for tuning scores (e.g., see operation 408 of method 400 of FIG. 4 as described above) these thresholds may be tuned over time using web page suggestion experiments.

At operation 1304, determining a time period associated with the success rate, with a shorter period of time (e.g., one month) for high traffic and/or faster changing websites and a longer period of time (e.g., one year) for lower traffic and/or more slowly changing websites.

At operation 1306, determining the features to be used to identify successful web pages (e.g., URLs) by the machine learning model. For example, the OKAPI BM 25 ranking function for titles (BM=best matching) to estimate the relevance of documents (e.g., HTML documents associated with a web page) to a given search query (e.g., input keyword).

At operation 1308, using the success data as training data to train the machine learning model to rank the web pages based on the success data. Parameters associated with the machine learning model may be updated based on the machine learning model processing the input training data (e.g., the success data associated with the web pages).

The method 1300 may then end.

Figure 14:
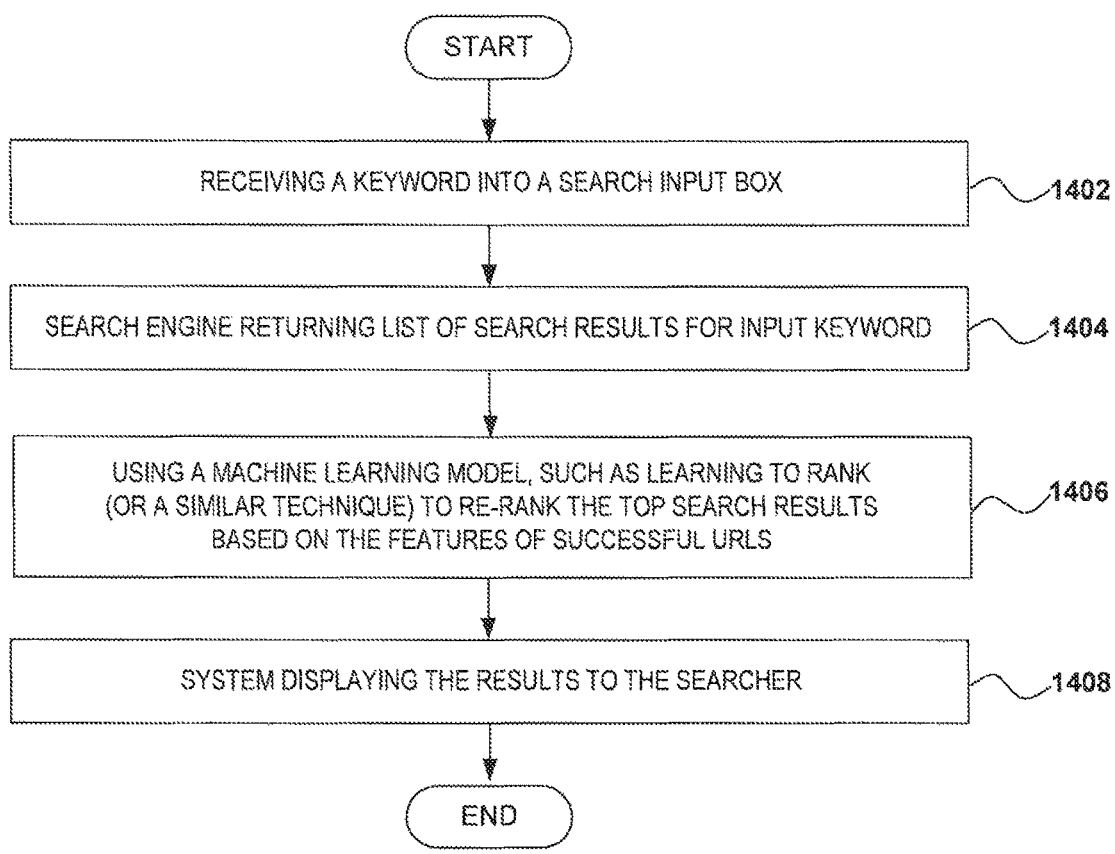
FIG. 14 is a flow diagram illustrating a method for using the machine learning model to rank web page suggestions, according to some embodiments of the present disclosure.

FIG. 14 is a flow diagram illustrating a method 1400 for using the machine learning model to rank web page suggestions, according to some embodiments of the present disclosure.

The method 1400 may start and include the following:

At operation 1402, receiving a keyword (e.g., any characters including spaces and/or more than one English or other language word) from a searcher into a search input box.

At operation 1404, the search engine returns a list of ordered search results for the input keyword (e.g., based on one or more search algorithms).

At operation 1406, re-ordering the search results based on a trained machine learning model. For example, the machine learning model trained to rank (e.g., or re-rank) successful web pages (e.g., URLs) according to method 1300 of FIG. 13 as described above.

At operation 1408, displaying the re-ordered search results to the searcher.

The method 1400 may then end.

Success rates may similarly be used in two different ways to improve the rankings for content recommendation, a rules-based approach and a machine learning approach. The website operator may determine the rules used to process the success data to determine which target web pages for each origin web page leads to user success. The rules-based approach is described below with respect to FIG. 15. The machine learning approach may use much of the same data discussed below with respect to FIG. 15 as features, but may use an approach more similar to the machine learning improvements for the search engine rankings as described above with respect to FIG. 13 and FIG. 14.

Figure 15:
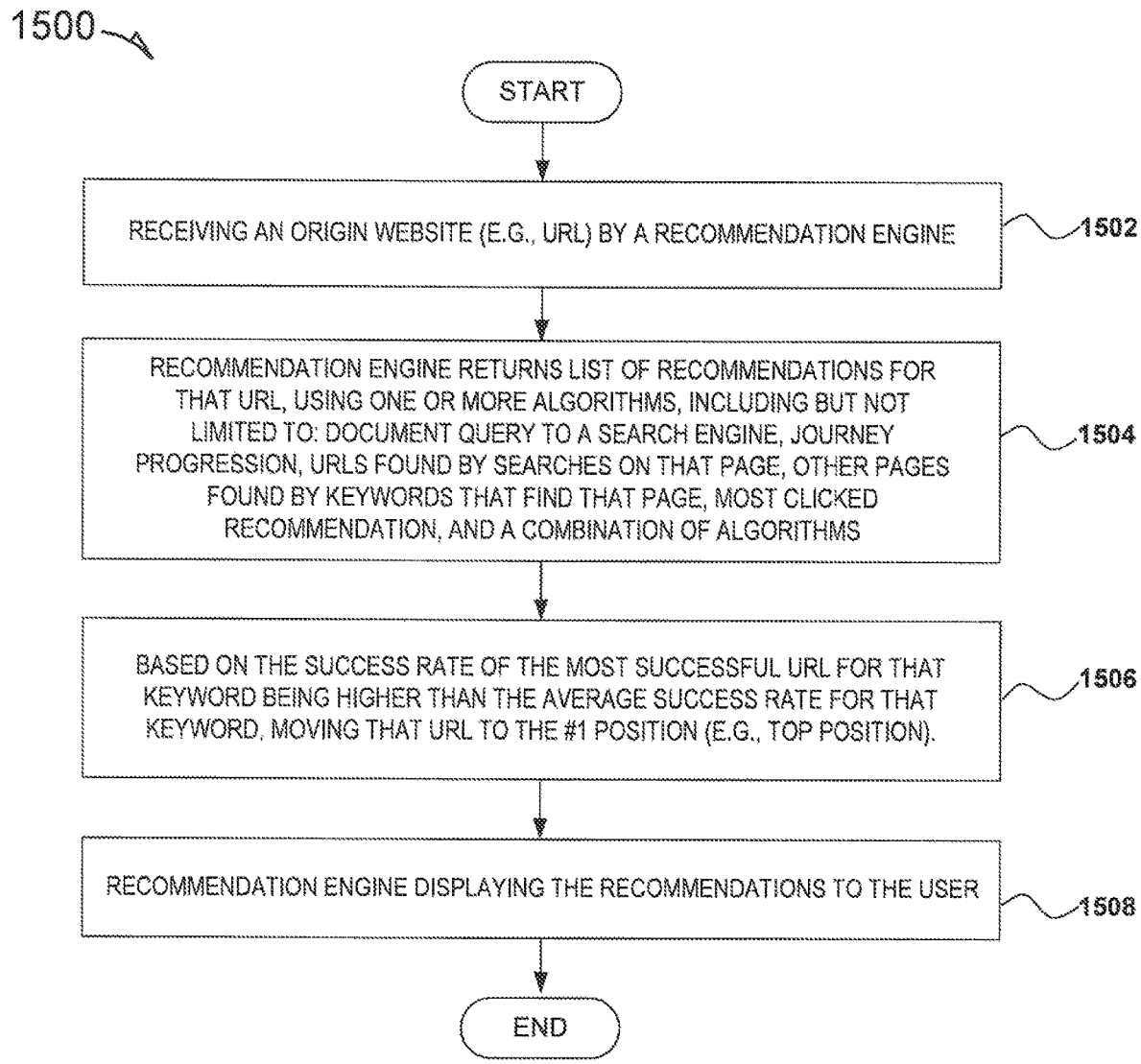
FIG. 15 is a flow diagram illustrating a method for determining web page suggestions for content recommendation, according to some embodiments of the present disclosure.

FIG. 15 is a flow diagram illustrating a method 1500 for determining web page suggestions for content recommendation, according to embodiments of the present disclosure.

The method 1500 may start and include the following:

At operation 1502, receiving an origin web page URL by a recommendation engine (e.g., a URL associated with a web page visited by a website user).

At operation 1504, the recommendation engine returns a list of recommendations for the input web page URL based on one or more algorithms including: document query to search engine, journey progression, URLs found by searches on the web page, other web pages found by keywords that find the web page, most clicked recommendation and/or a combination of these one or more algorithms.

At operation 1506, ordering the search results based on web pages with success rates that are higher than the average success rate for the input keyword (e.g., based on historical data) being placed in the top positions in the presented search results and pushing the rest of the search results down the list of the presented search results. In some embodiments the success rates may be based, at least in part, on a specified period of time (e.g., in order to account for some sites having more user traffic and/or changing faster than others) and/or a minimum number of successes having been achieved.

At operation 1508, displaying the ordered recommendation results to the searcher.

The method 1500 may then end.

Figure 16:
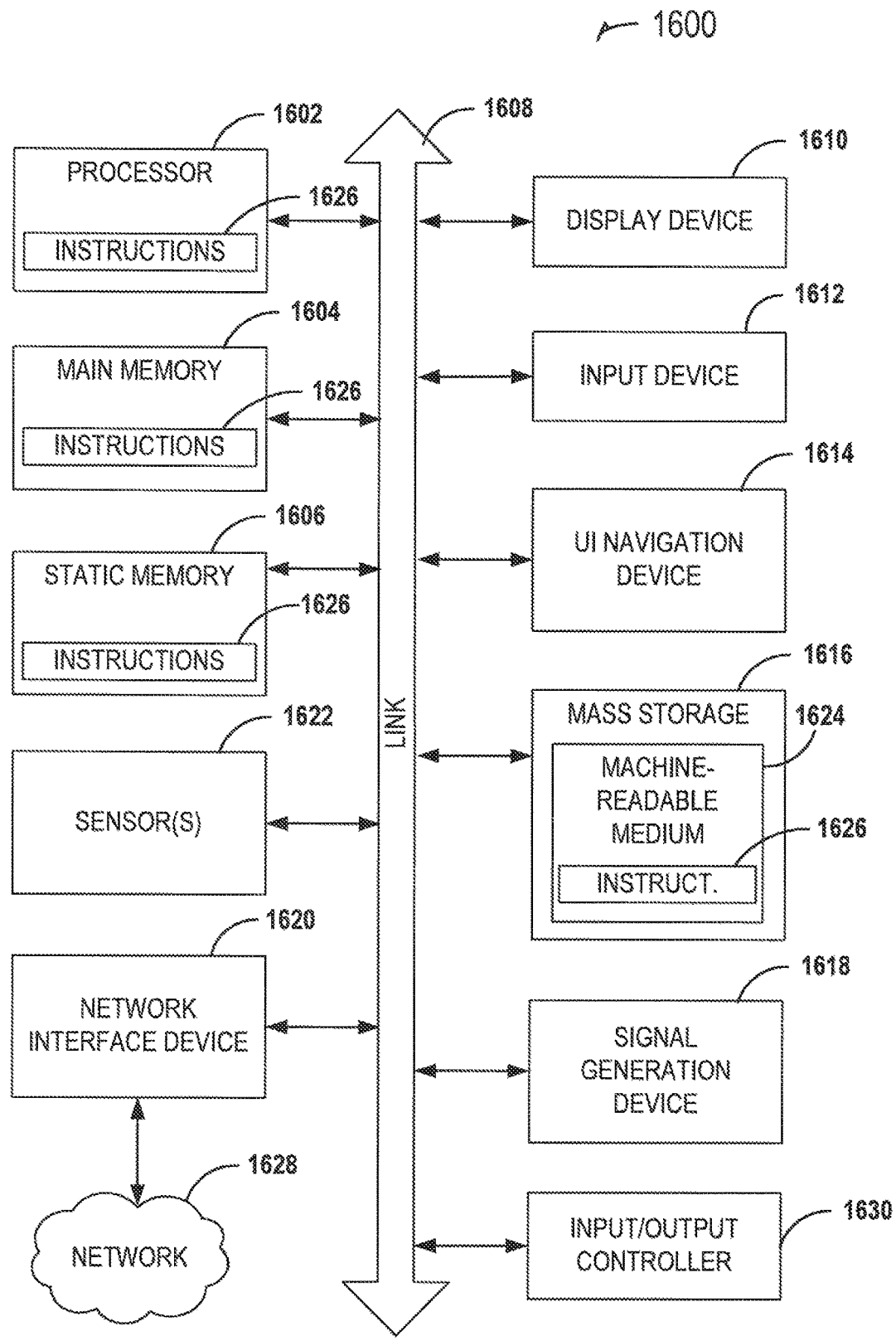
FIG. 16 is a block diagram illustrating a machine in the example form of a computer system 1600.

FIG. 16 is a block diagram illustrating a machine in the example form of a computer system 1600, within which a set or sequence of instructions may be executed to cause the machine to perform any one of the methodologies discussed herein, according to some embodiments of the present disclosure.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein (e.g., method 100 of FIG. 1 to method 1500 of FIG. 15).

Example computer system 1600 includes at least one processor 1602 (e.g., a central processing unit (CPU), a graphics processing unit (GPU) or both, processor cores, compute nodes, etc.), a main memory 1604 and a static memory 1606, which communicate with each other via a link 1608 (e.g., bus). The computer system 1600 may further include a video display unit 1610, an alphanumeric input device 1612 (e.g., a keyboard), and a user interface (UI) navigation device 1614 (e.g., a mouse). In one embodiment, the video display unit 1610, input device 1612 and UI navigation device 16116 are incorporated into a touch screen display. The computer system 1600 may additionally include a storage device 1616 (e.g., a drive unit), a signal generation device 1618 (e.g., a speaker), a network interface device 1620, and one or more sensors 1622, such as a global positioning system (GPS) sensor, accelerometer, gyrometer, magnetometer, or other sensor.

The storage device 1616 includes a machine-readable medium 1624 on which is stored one or more sets of data structures and instructions 1626 (e.g., software) embodying or utilized by any one or more of the methodologies or functions described herein. The instructions 1626 may also reside, completely or at least partially, within the main memory 1604, static memory 1606, and/or within the processor 1602 during execution thereof by the computer system 1600, with main memory 1604, static memory 1606, and the processor 1602 comprising machine-readable media.

While the machine-readable medium 1624 is illustrated in an example embodiment to be a single medium, the term "machine-readable medium" may include a single medium or multiple media (e.g., a centralized or distributed database, and/or associated caches and servers) that store the one or more instructions 1626. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1626 may further be transmitted or received over a communications network 1628 using a transmission medium via the network interface device 1620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 16G LTE/LTE-A or WiMAX networks). The term "transmission medium" shall be taken to include any intangible medium that is capable of storing, encoding, or carrying instructions for execution by the machine, and includes digital or analog signals or other intangible medium to facilitate communication of such software.

Example computer system 1600 may also include an input/output controller 1630 to receive input and output requests from at least one central processor 1602, and then send device-specific control signals to the device they control. The input/output controller 1630 may free at least one central processor 1602 from having to deal with the details of controlling each separate kind of device.

Language: In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms generally conceived to be self-consistent sequences of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussion, it is appreciated that throughout the description, discussions utilizing terms such as "segmenting", "analyzing", "determining", "enabling", "identifying" "modifying", "parsing" or the like, refer to the actions and processes of a computer system, or similar electronic computing device, that manipulates and transforms data represented as physical (e.g., electronic) quantities within the computer system's registers and memories into other data represented as physical quantities within the computer system memories or other storage, transmission or display device.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. Moreover, use of the term "an embodiment" or "one embodiment" or "an implementation" or "one implementation" throughout the disclosure is not intended to mean the same embodiment or implementation unless described as such.

It is to be understood that the above description is intended to be illustrative, and not restrictive. Many other embodiments/implementations will be apparent to those of skill in the art upon reading and understanding the above description.

The invention claimed is:

1. A method for optimized modification of a website based on user interactions with the website, the method comprising:
  collecting data associated with a user interactions with the website;
  determining a success or failure of each of the user interactions;
  modifying a configuration of the website based on the determined success or failure of at least one user interaction;
  presenting the modified website configuration to a specified number of test users;
  for each test user, determining a success or failure of each of a test user's interactions with the modified website configuration;
  determining that the modified configuration is successful based on a threshold number of test user interactions having been determined to be successful; and
  modifying elements of the website based on the modified configuration.

2. The method of claim 1, further comprising loading a computer program that adds new functions to the website without altering any of a website's programming, when a user first interacts with the website, to collect the data associated with the user interactions.

3. The method of claim 1, further comprising dividing the user interactions into sessions that include at least one of: page scrolling, cursor movement, window resizing, clicks, input into forms, switching browser tabs, or exiting the website.

4. The method of claim 1, wherein:
  the determination of success of user interactions includes determining that at least one of: a task has been completed, a specified link has been clicked, or a threshold amount of time was spent on a web page; and
  the determination of failure of user interactions includes determining that at least one of: a task was not completed, a specified link has not been clicked or a threshold amount of time was not spent on the web page.

5. The method of claim 1, further comprising determining a score for ranking each success and failure of the user interactions.

6. The method of claim 5, further comprising using a heuristic to determine the score for ranking each success and failure of the user interactions.

7. The method of claim 6, further comprising using a machine learning model to tune successful user interactions based on the collected data or based on user success surveys associated with the user interactions.

8. The method of claim 1, wherein modifying the configuration of the website includes modifying at least one of: an appearance of a search input box or search results page, pages curated to specific keywords, weights used to rank search algorithms, use of multiple search algorithms, or use of synonyms.

9. The method of claim 1, wherein modifying the configuration of the website includes modifying at least one of: an appearance of recommendations, pages curated to specific origin pages, weights used to rank recommendation algorithms, use of multiple recommendation algorithms, or a position of results of recommendation algorithms.

10. The method of claim 1, wherein modifying elements of the website based on the modified configuration includes modifying at least one of: keywords presented to a searcher based on an incomplete input keyword, order of keywords presented to a searcher based on an input keyword, web pages presented to a searcher based on an input keyword, or order of web pages presented to a searcher based on an input keyword.

11. The method of claim 10, further comprising using a machine learning model to tune at least one of: the order of keywords presented to a searcher based on an input keyword or the order of web pages presented to a searcher based on an input keyword.

12. A system for optimized modification of a website based on user interactions with the website, the system comprising one or more processors and one or more storage devices, the one or more storage devices storing instructions that, when executed by the one or more processors, cause the one or more processors to:
collect data associated with the user interactions with the website;
determine a success or failure of each of the user interactions;
modify a configuration of the website based on the determined success or failure of at least one user interaction;
present the modified website configuration to a specified number of test users;
for each test user, determine a success or failure of each of a test user's interactions with the modified website configuration;
determine that the modified configuration is successful based on a threshold number of test user interactions having been determined to be successful; and
modify elements of the website based on the modified configuration.

13. The system of claim 12, further comprising instructions that, when executed by the one or more processors, cause the one or more processors to divide the user interactions into sessions that include at least one of: page scrolling, cursor movement, window resizing, clicks, input into forms, switching browser tabs, or exiting the website.

14. The system of claim 12, wherein:
the determination of success of user interactions includes a determination that at least one of: a task has been completed, a specified link has been clicked, or a threshold amount of time was spent on a web page; and
the determination of failure of user interactions includes a determination that at least one of: a task was not completed, a specified link has not been clicked or a threshold amount of time was not spent on the web page.

15. The system of claim 12, further comprising instructions that, when executed by the one or more processors, cause the one or more processors to determine a score for ranking each success and failure of the user interactions.

16. The system of claim 15, further comprising instructions that, when executed by the one or more processors, cause the one or more processors to use a machine learning model to tune successful user interactions based on the collected data or based on user success surveys associated with the user interactions.

17. The system of claim 12, wherein to modify the configuration of the website includes a modification of at least one of: an appearance of a search input box or search results page, pages curated to specific keywords, weights used to rank search algorithms, use of multiple search algorithms or use of synonyms.

18. The system of claim 12, wherein to modify the configuration of the website includes a modification of at least one of: an appearance of recommendations, pages curated to specific origin pages, weights used to rank recommendation algorithms, use of multiple recommendation algorithms or a position of results of recommendation algorithms.

19. The system of claim 12, wherein to modify elements of the website based on the modified configuration includes a modification of at least one of: keywords presented to a searcher based on an incomplete input keyword, order of keywords presented to a searcher based on an input keyword, web pages presented to a searcher based on an input keyword, or order of web pages presented to a searcher based on an input keyword.

\* \* \* \* \*